(12) United States Patent
James et al.

(10) Patent No.: US 9,177,408 B2
(45) Date of Patent: Nov. 3, 2015

(54) MODIFYING AN ANIMATION HAVING A CONSTRAINT

(75) Inventors: Greg James, Redwood City, CA (US); John Horn, Fairfax, CA (US); Laurie Berliner, legal representative, Fairfax, CA (US); Adam Schnitzer, Petaluma, CA (US); Max S-Han Chen, San Mateo, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 597 days.

(21) Appl. No.: 13/161,286

(22) Filed: Jun. 15, 2011

(65) Prior Publication Data

US 2012/0320066 A1    Dec. 20, 2012

(51) Int. Cl.
*G06T 13/00* (2011.01)

(52) U.S. Cl.
CPC ...................................... *G06T 13/00* (2013.01)

(58) Field of Classification Search
CPC ......... G06T 13/80; G06T 13/40; G06T 19/00; G06T 2200/24; G06T 11/206; G06T 13/00; G06F 17/211; G06F 3/002
USPC ............................................. 345/473; 34/473
See application file for complete search history.

(56) References Cited

U.S. PATENT DOCUMENTS

| | | | |
|---|---|---|---|
| 6,353,437 B1 * | 3/2002 | Gagne | 345/473 |
| 6,629,065 B1 | 9/2003 | Gadh et al. | |
| 2004/0012593 A1 * | 1/2004 | Lanciault | 345/473 |
| 2004/0119717 A1 * | 6/2004 | Furumoto et al. | 345/473 |
| 2010/0207949 A1 * | 8/2010 | Spencer | 345/473 |

OTHER PUBLICATIONS

Autodesk, Inc. "Autodesk Maya 2010: Getting Started with Maya", 2009, downloaded from the internet at: http://images.autodesk.com/adsk/files/gettingstartedmaya2010.pdf on Jun. 29, 2011, Cover page, Table of Contents, Chapter 6, 135 pages.

Microsoft, "APP HUB Community Forums: Exporting Animation Step Keys", Oct. 21, 2008, downloaded from the internet at: http://forums.create.msdn.com/forums/t/18976.aspx on Jun. 28, 2011, 1 page.

PL Studios, Inc. "Digital Tutors: Community Forums: Thread: Character Animation Problem: Phantom Step Key Pops Leg Up??" Jun. 17, 2009, downloaded from the internet at: http://www.digitaltutors.com/forum/showthread.php?18630-Character-Animation-problem-Phantom-step-key-pops-leg-up on Jun. 28, 2011, 2 pages.

(Continued)

*Primary Examiner* — Mark Zimmerman
*Assistant Examiner* — F. M. Hossain
(74) *Attorney, Agent, or Firm* — Kilpatrick Townsend & Stockton LLP

(57) ABSTRACT

A computer-implemented method for handling a modification of an animation having a constraint includes detecting a user modification of an animation that involves at least first and second objects, the first object constrained to the second object during a constrained period and non-constrained to the second object during a non-constrained period. The method includes, based on the user modification, selecting one of at least first and second compensation adjustments for the animation based on a compensation policy; and adjusting the animation according to the selected compensation adjustment.

31 Claims, 13 Drawing Sheets

(56) References Cited

OTHER PUBLICATIONS

Wikipedia, "Animation" May 28, 2010, downloaded from the internet at: http://web.archive.org/web/20100528081917/http://en.wikipedia.org/wiki/Animation on Jun. 28, 2011, 10 pages.

Wikipedia, "Bezier Curve", May 30, 2010, downloaded from the internet at: http://web.archive.org/web/20100530233921/http://en.wikipedia.org/wiki/B%C3%A9zier_curve on Jun. 28, 2011, 10 pages.

Wikipedia, "Computer Animation", Apr. 30, 2010, downloaded from the internet at: http://web.archive.org/web/20100430162149/http://en.wikipedia.org/wiki/Computer_animation on Jun. 28, 2011, 7 pages.

Wikipedia, "Spline (mathematics)", Oct. 14, 2009, downloaded from the internet at: http://web.archive.org/web/20091014015215/http://en.wikipedia.org/wiki/Spline_(mathematics) on Jun. 28, 2011, 8 pages.

Dominici, Paolo, "ZV Parent Master 1.2—New features Video", Nov. 14, 2008, XP002709924, Retrieved from the Internet: URL:http://www.youtube.com/watch?v=vHNMwWj2Cyw [retrieved on Jul. 23, 2013].

Notification of Transmittal of the International Search Report and the Written Opinion of the International Searching Authority, or the Declaration; International Search Report and Written Opinion of the International Searching Authority for corresponding International Application No. PCT/US2012/042508 mailed on Sep. 6, 2013, 9 pages.

Silicon Graphics, Inc. "IRIX 6.5 Product Release Notes/Information", downloaded from the internet at http://techpubs.sgi.com/library/tpl/cgi-bin/getdoc.cgi?coll=0650&db=relnotes&fname=/usr/rlenotes/cosmoworlds on Apr. 2, 2012, 33 pages.

The University of Queensland, "VisLab: Creating and Animating a Rocket", Jan. 18, 2001, downloaded from the internet at: http://www.vislab.uq.edu.au/users/manuals/cosmoworlds/Tutorial/rocket_intro.html on Apr. 2, 2012, 18 pages.

\* cited by examiner

Same Trajectory
Change Grab

New Trajectory
Same Grab

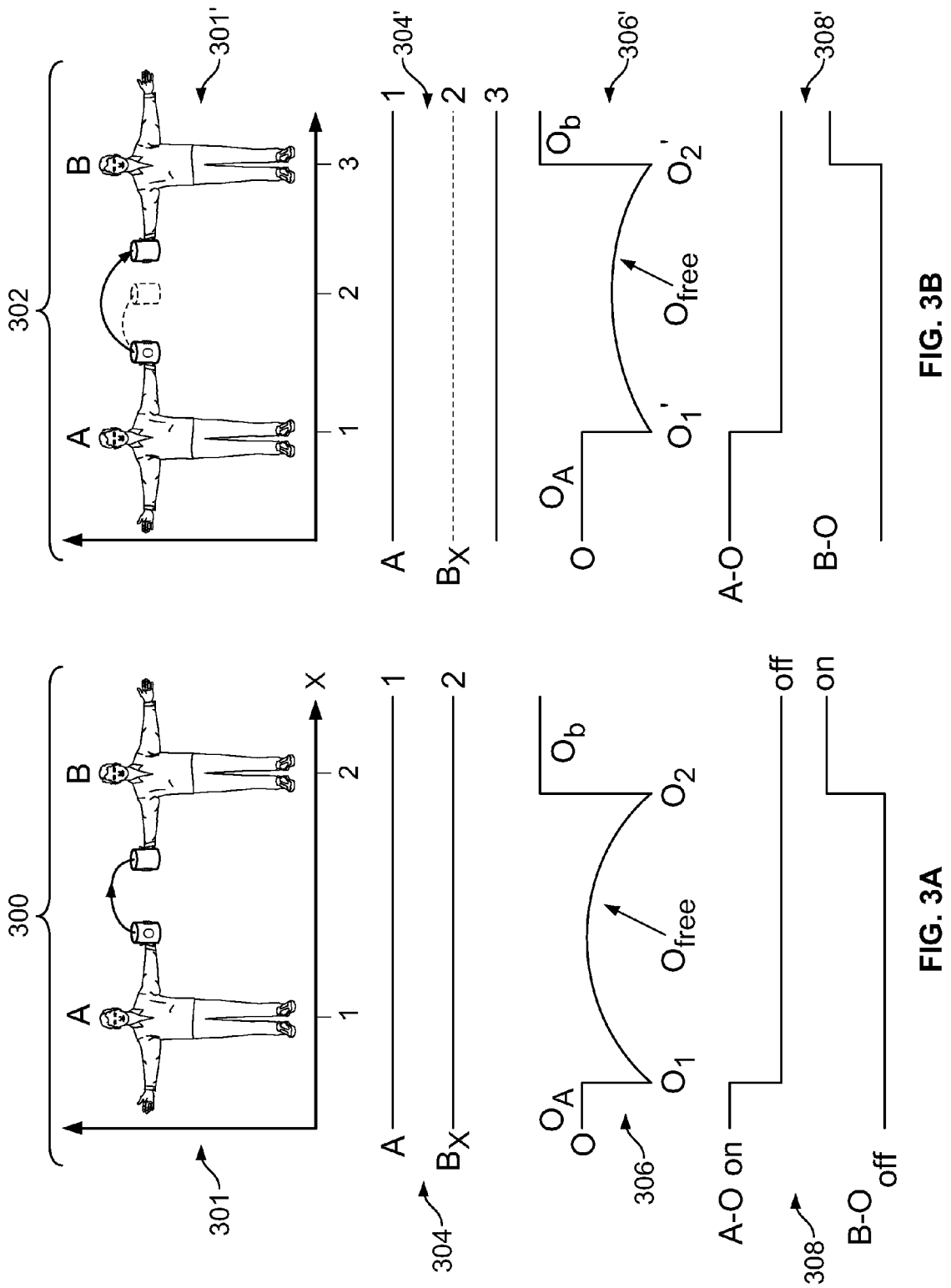

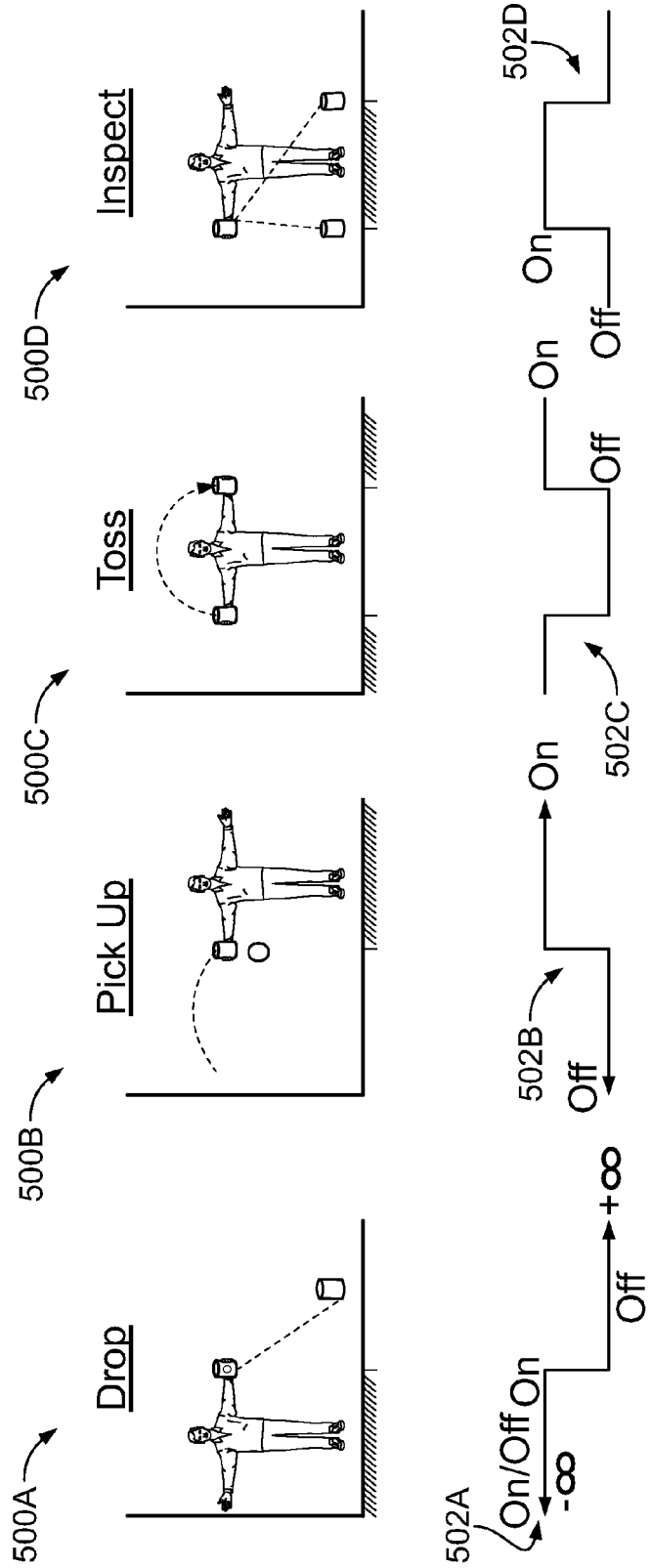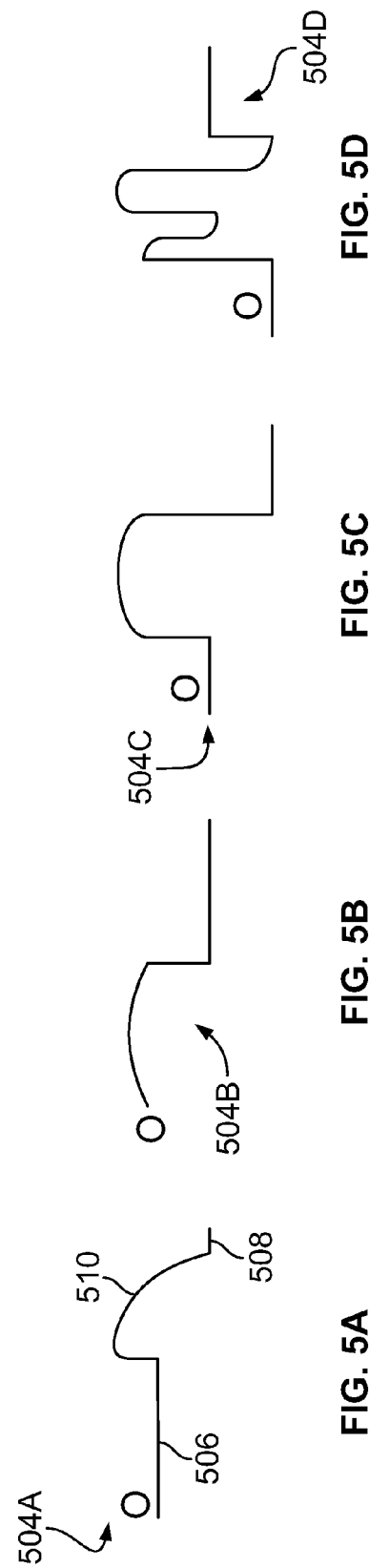

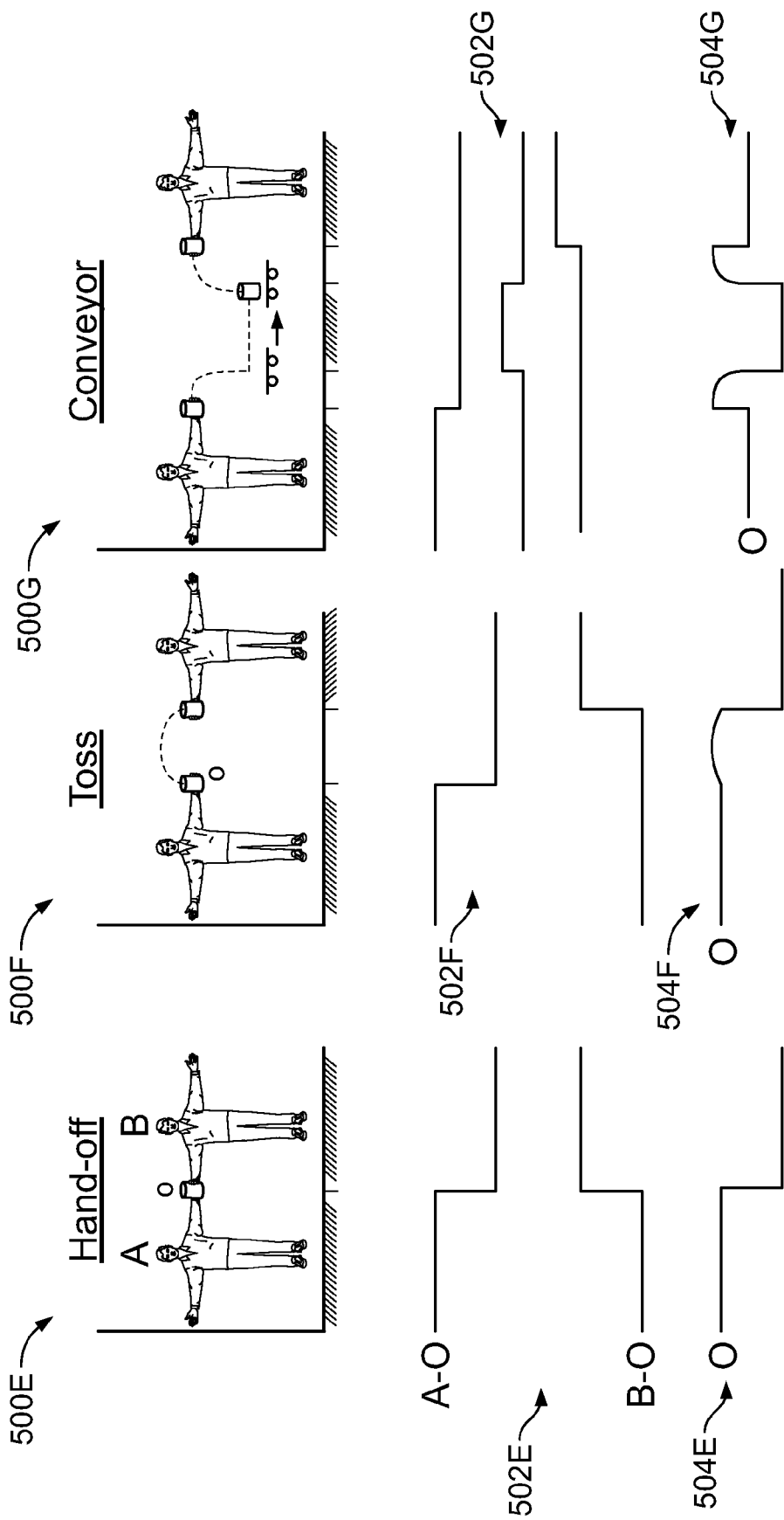

Hierarchy of Constraints

MODIFYING AN ANIMATION HAVING A CONSTRAINT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This document relates to computer-based animation.

BACKGROUND

In some animation programs, attempts to use constraints between objects have caused unintended effects. In certain situations, making or breaking a constraint has caused the constrained object to fly away to an unexpected place in the virtual space of the animation.

For example, in an animation program where each defined constraint would remain in effect (i.e., active) throughout the animation, a rather elaborate work-around approach has been used. Two identical versions of the to-be-constrained object were created: one version that had the constraint and another version that did not have the constraint. The animator would then make only one of the two object versions visible in the animation at any given time, with the other version being hidden. In this way, the animator could deal with the situation that the constraint was constantly in effect.

However, the presence or absence of constraints was not conspicuously indicated in such programs. For example, when the animator adjusted the position of an object in the animation, no knowledge that another object was (at least temporarily) dependent on the moved object was provided or used.

SUMMARY

In a first aspect, a computer-implemented method for handling a modification of an animation having a constraint includes detecting a user modification of an animation that involves at least first and second objects, the first object constrained to the second object during a constrained period and non-constrained to the second object during a non-constrained period. The method includes, based on the user modification, selecting one of at least first and second compensation adjustments for the animation based on a compensation policy; and adjusting the animation according to the selected compensation adjustment.

Implementations can include any or all of the following features. The user modification includes changing a position of the second object. Adjusting the animation comprises changing a behavior of the first object in the non-constrained period and not in the constrained period. Adjusting the animation comprises changing a configuration of the second object without changing a behavior of the first object. Adjusting the animation comprises traversing constraints in the animation to identify at least one step key as being affected by the user modification. The second object is constrained to a third object for at least part of the constrained period, and wherein traversing the constraints comprises searching for step keys in a constraint hierarchy.

The compensation policy addresses situations involving at least: the constrained period being terminated by the non-constrained period; the non-constrained period being terminated by the constrained period; the constrained period being terminated by the non-constrained period, which in turn is terminated by another constrained period to the second object; the non-constrained period being terminated by the constrained period, which in turn is terminated by another non-constrained period; the constrained period being terminated by another constrained period to a third object; the constrained period being terminated by the non-constrained period, which in turn is terminated by the other constrained period to the third object; and the constrained period being terminated by the other constrained period to the third object, which in turn is terminated by another constrained period to a fourth object.

The first and second objects are displayed in a graphical user interface having an animation area, the method further comprising: determining, after adjusting the animation, that the user modification causes a limit violation in the animation; and changing, in the animation area, a representation of the constraint between the first and second objects to indicate the limit violation.

In a second aspect, a computer-implemented method for handling a modification of an animation having a constraint includes detecting a user modification of an animation that involves at least first and second objects, the first object constrained to the second object during a constrained period and non-constrained to the second object during a non-constrained period. The method includes, based on the user modification, traversing constraints in the animation to identify at least one step key as being affected by the user modification. The method includes adjusting the identified step key to compensate for the user modification.

Implementations can include any or all of the following features. The first and second objects are displayed in a graphical user interface having an animation area. The method further includes changing, in the animation area, a representation of the constraint between the first and second objects depending on whether the first object is currently constrained to the second object. The method further includes determining, after adjusting the animation, that the user modification causes a limit violation in the animation; and changing, in the animation area, a representation of the constraint between the first and second objects to indicate the limit violation.

The second object is constrained to a third object for at least part of the constrained period, and wherein traversing the constraints comprises searching for step keys in a constraint hierarchy. The user modification comprises at least one selected from the group consisting of: a position change, a rotation change, a scale change, a time change, and combinations thereof. The first and second objects are displayed in a graphical user interface having a view area for creating and playing the animation, and a timeline area for at least visualizing constraints for the animation, and wherein the timeline area includes a start marker and an end marker for the constrained period. The user modification moves both the start and end markers in the timeline area without changing a length of the constrained period. The user modification moves one, and not the other, of the start and end markers in the timeline area, and wherein a length of the constrained period is changed according to the move. The user modification moves one of the start and end markers to coincide with an opposite marker relating to another constraint for the first object, the method further comprising merging a step key of the moved marker with a step key for the opposite marker.

The other constraint also constrains the first object to the second object, and wherein the merger creates a signal continuous constraint for the first object to the second object. The other constraint constrains the first object to a third object, and wherein the merged step key represents a transition by the first object from the second object to the third object without any intervening unconstrained period.

One or more methods can be implemented as a computer program product tangibly embodied in a computer-readable storage medium and including instructions that when executed by a processor perform the method.

In a third aspect, a system includes: at least one processor; and a computer readable storage device having stored therein instructions that when executed cause the processor to generate: a graphical user interface comprising at least an animation area for displaying an animation that involves at least first and second objects; and a constraint object controlling when the first object is constrained to the second object and when the first object is non-constrained to the second object.

Implementations can include any or all of the following features. The first and second objects are displayed in a graphical user interface having a view area for creating and playing the animation, and a timeline area for at least visualizing constraints for the animation, and wherein the timeline area includes a start marker and an end marker for the constrained period. The graphical user interface changes, in the animation area, a representation of the constraint between the first and second objects depending on whether the first object is currently constrained to the second object. Upon the user modification causing a limit violation in the animation, the graphical user interface changes, in the animation area, a representation of the constraint between the first and second objects to indicate the limit violation.

In a fourth aspect, a computer program product is tangibly embodied in a computer-readable storage medium. The computer program product includes instructions that, when executed, generate on a display device a graphical user interface for handling a modification of an animation having a constraint. The graphical user interface includes: a view area for creating and playing an animation that involves at least first and second objects, the first object constrained to the second object during a constrained period and non-constrained to the second object during a non-constrained period; and a timeline area for at least visualizing constraints for the animation; wherein upon a user modification of the animation, at least some of the constraints in the animation are traversed to identify at least one step key as being affected by the user modification, and the identified step key is adjusted to compensate for the user modification.

Implementations can include any or all of the following features. The user modification moves the constrained period in the timeline area without changing a length of the constrained period. The user modification moves a start or end of the constraint in the timeline area, and wherein a length of the constrained period is changed according to the move. The graphical user interface changes, in the animation area, a representation of the constraint between the first and second objects depending on whether the first object is currently constrained to the second object. Upon the user modification causing a limit violation in the animation, the graphical user interface changes, in the animation area, a representation of the constraint between the first and second objects to indicate the limit violation.

Implementations can provide any or all of the following advantages. Computer animation can be improved, for example by providing artists with a user interface that incorporates powerful animation functions, yet is intuitive and easy to use. Interactions between characters or other objects in an animation can be defined more flexibly, for example when one object is to be made dependent on another object in the animation. A more useful visual representation of object relationships can be provided.

The details of one or more implementations are set forth in the accompanying drawings and the description below. Other features and advantages will be apparent from the description and drawings, and from the claims.

DESCRIPTION OF DRAWINGS

FIGS. 3A-B schematically show examples of constraints and step keys.
FIGS. 5A-G show examples of situations addressed by a compensation policy.

Like reference symbols in the various drawings indicate like elements.

DETAILED DESCRIPTION

Described herein are systems and techniques for handling a modification made by a user to an animation that involves a constraint between two or more objects. For example, it is described that one or more compensations can be applied to the animation based on the user modification. The compensation can involve adjusting a path or other trajectory of an object, or changing the configuration of an object, to name just two examples.

This document describes examples of a first object being constrained to at least one second object. That the first object is constrained—i.e., that it has a constraint defined for it—signifies that one or more parameters for the first object are defined or specified relative to the second object. The parameter specified relative to another object is sometimes said to be local (e.g., defined in a local space), as opposed to another parameter defined relative to a global, or world, space. The parameter(s) specified relative to the second object can include, without limitation, any of the first object's position, rotation, scale, motion, appearance, or any other characteristic, to name a few examples.

Figure 1:
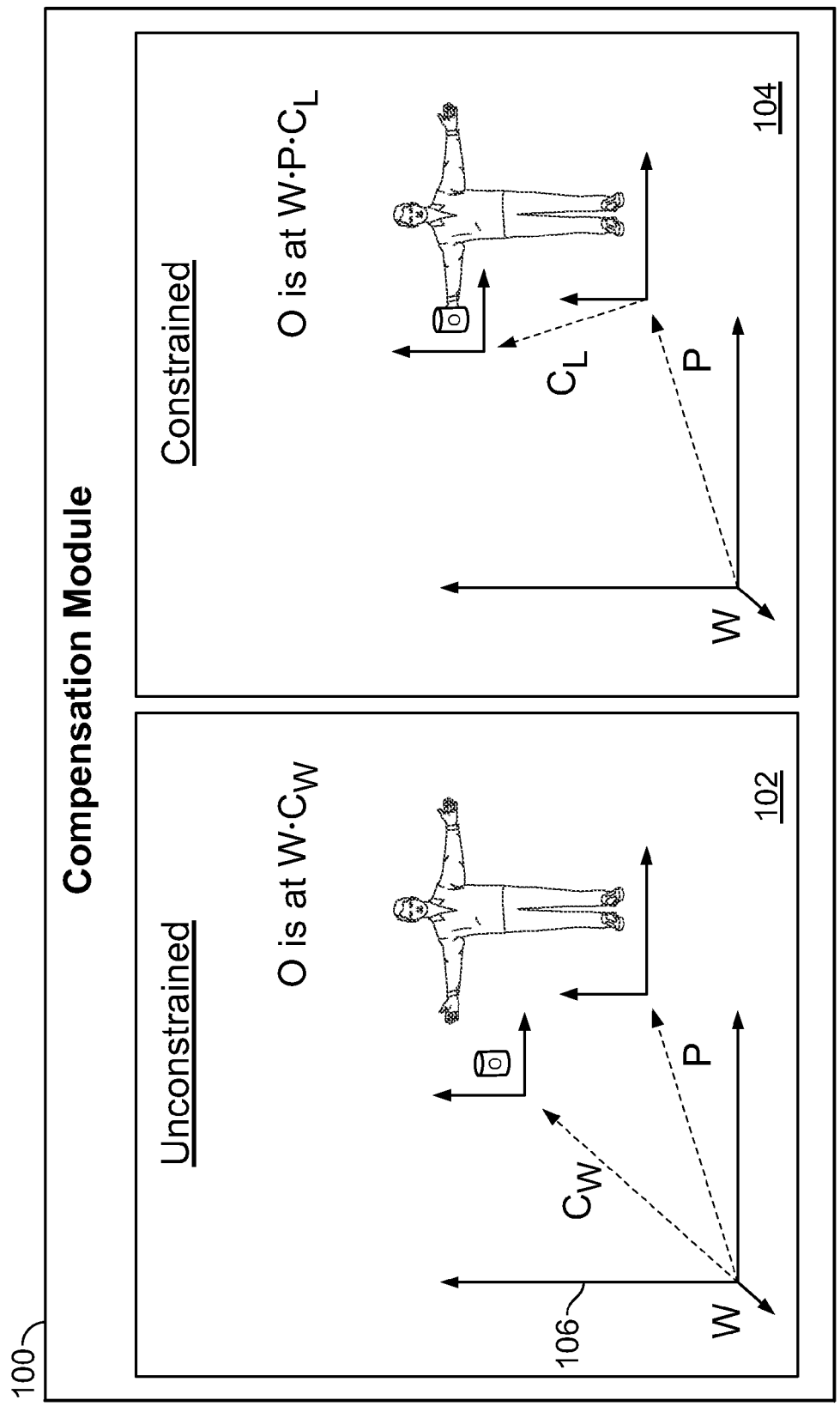
FIG. 1 shows an example of a compensation module.

FIG. 1 shows an example of a compensation module 100. The compensation module 100 can make one or more adjustments to an animation (e.g., an animated sequence) to compensate for a change that a user makes in the animation. Here, the compensation module 100 is used with an animation that involves an object O and a person. In an unconstrained state 102, the object O is currently not constrained to the person. By contrast, the object O will be constrained to the person in a constrained state 104 which will be described later.

In the unconstrained state 102, any location in space or time can be specified relative to a world space 106. Here, the world space 106 includes a Cartesian coordinate system that can be defined by any matrix M, for example the identity matrix. Both the person and the object O currently have their positions, rotations, motion, etc., defined relative to the world space 106. For example, the person is positioned by a matrix P and the object O is positioned by a matrix $C_W$, where the subscript W signifies that the matrix relates to the world space 106. The person's position is set by W*P, and the position of the object O is set by $W*C_W$. That is, the object O is currently not constrained to the person because the object O's parameters (e.g., location) are not defined relative to, or based on, the person's parameters.

In the constrained state 104, however, the person has grasped the object O and is currently holding the object. The object O is now constrained to the person, meaning that the object O's parameters should instead be defined based on the person's parameters. The person's position is still set by W*P as before. The object O, however, should now have its position set by a local matrix $C_L$ relative to the person's position. That is, the object O's position should now be set by $W*P*C_L$. By contrast, if the object O's position were still defined by $W*C_W$ then a nonsensical result might be obtained, because the matrix $C_W$ when read against a local coordinate system would not necessarily correspond to one of the person's hands, and likely points to a location far removed from the person.

It is important to note that the above change from the unconstrained state 102 to the constrained state 104 should be done essentially instantaneously without triggering any actual or apparent movement of the object O. That is, the object O should be in the same position relative to the world space 106 immediately before and after the transition to the constrained state 104. In other words, the following relationship must hold true:

$$W*C_W = W*P*C_L$$

It follows from the above that the matrix $C_L$, which defines the position of the object O in the constrained state 104, can be obtained as follows:

$$C_L = P^{-1} * C_W$$

where $P^{-1}$ is the inverse of the matrix P. In other words, the local matrix for the constrained object (i.e., the "child" object) is the inverse of the parent object's matrix times the unconstrained object's world space matrix.

Figure 2A:
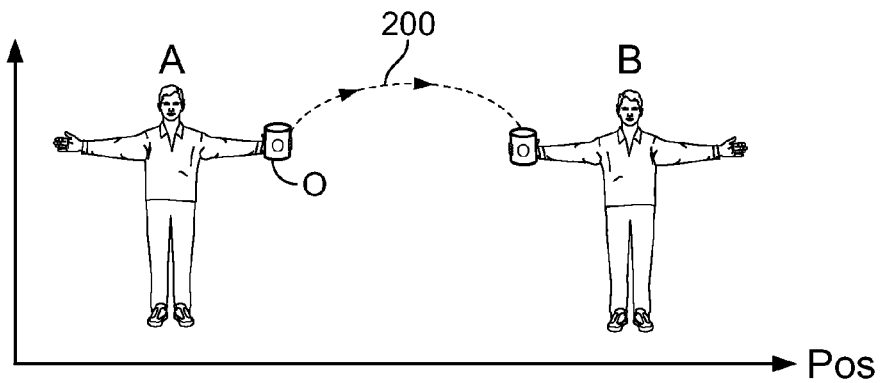
FIGS. 2A-C show examples of constraints and of compensations.
Figure 2B:
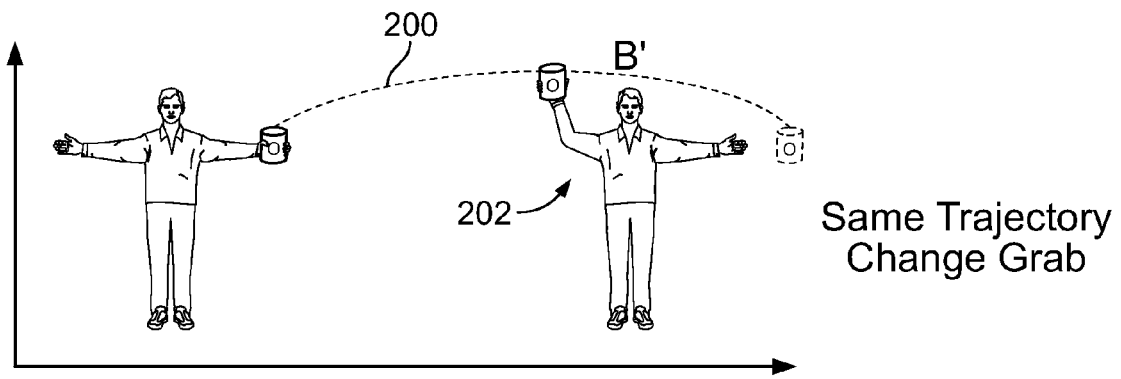
Figure 2C:
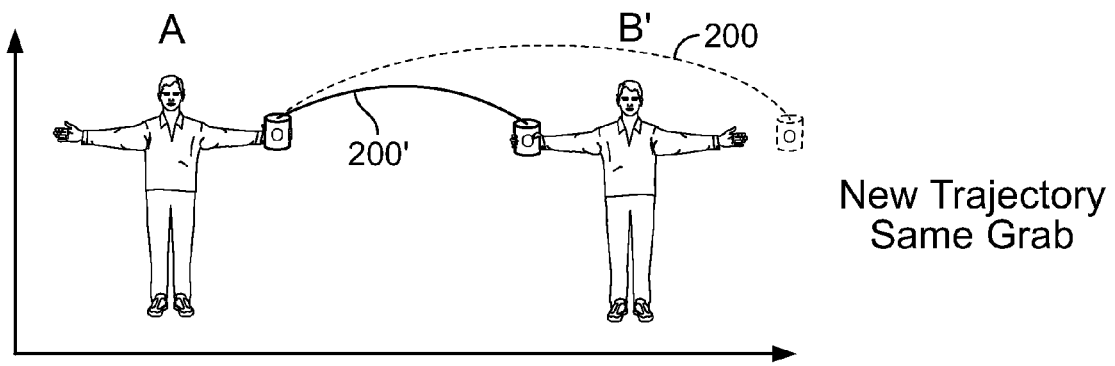

So far in this example, the compensation module 100 has not performed any compensation. However, if the user decides to alter some aspect of the animation it may be necessary to compensate in order to maintain a natural and intuitive behavior. FIGS. 2A-C show examples of constraints and of compensations. Here, the animation involves two persons A and B, and an object O that is being thrown from A to B. A trajectory 200 has been defined for the object O, as schematically illustrated in FIG. 2A. That is, given the current locations of the persons A and B, including the positions of their hands, the trajectory 200 is the correct one for this animation because it ensures that the object O lands in B's hand as intended.

Suppose now that a user changes the position of the person B as illustrated in FIG. 2B. Now, the person B' is closer to the person A than before. If the trajectory 200 is kept the same, then the object O will not land in the hand of the person B' as originally intended. One possible compensation for this change is to change the person B' into a new configuration 202, for example by raising the hand of the person B' upward. That is, the new configuration 202 allows the hand of the person B' to intercept the trajectory 200, albeit earlier than in FIG. 2A, so that the object O is caught despite the user having decreased the distance between the persons. Accordingly, compensating by introducing the new configuration 202 is one approach that the compensation module 100 (FIG. 1) can choose, depending on the circumstances.

Another possible compensation is shown in FIG. 2C. Here, the trajectory 200 has been replaced by another trajectory 200', such that the person B' catches the object O at the new location specified by the user. The new configuration 202 (FIG. 2B) is not used in this example. That is, the adjustment of the flight path for the object O from the trajectory 200 to the trajectory 200' is here sufficient to compensate for the decreased distance between the persons. Accordingly, this is an example of another approach that the compensation module 100 (FIG. 1) can take depending on the circumstances.

The example of compensating by modifying a trajectory will now be described in further detail. FIGS. 3A-B schematically show examples of constraints and step keys. Generally, state 300 shows an animation 301 before any user modification and compensation are done. State 302, on the other hand, illustrates an animation 301' after the user modification and the corresponding compensation have both been made.

In the state 300, the animation 301 is defined, much as in the previous example, as having the person A throw the object O to the person B. That is, the object O is to be constrained to the person A up until the moment of the toss, then the object O is unconstrained while flying through the air, and finally the object O is to be constrained to the person B from when it is caught.

Position graph 304 shows that the person A is at position 1, and person B at position 2, throughout the animation 301 in the state 300. For simplicity, the separation is indicated only in a single dimension (i.e., the x-coordinate), but more than one dimension can be taken into account.

A step key graph 306 indicates various step keys involved in the animation 301. In this example, the animation 100 may be made from a large number of frames (e.g., dozens, hundreds, thousands or more) that are to be displayed in rapid succession to give the viewer the impression of continuous motion. Such a succession of frames can generally have one or more keyframes interspersed therein. In some implementations, each keyframe represents the beginning or end of a particular motion, and an animation process can then automatically generate intermediate frames between two keyframes to create a smooth transition. A step key, then, is a keyframe that has independent left and right values. Particularly, the left side of the step key (i.e., the one earlier in time of the two) corresponds to the state of an object before a transition, and the right side corresponds to the state after the transition. That is, the step keys can be used to effectuate the transition between world and local representation, or between different local representations.

The step key graph 306 in this example indicates that the object O is constrained to the person A during a time generally labeled as $O_A$. Similarly, the object O is constrained to the person B during a time generally labeled as $O_B$. In between these, a state $O_{free}$ corresponds to the period of flight. Particularly, a first step key $O_1$ represents the change when the object O goes from being constrained to the person A (i.e., at $O_A$) to being unconstrained ($O_{free}$). That is, the left side of the step key $O_1$ corresponds to the parameters for the object O local to the person A, while the right side of the step key $O_1$ corresponds to the parameters for the object O in world space. Similarly, a step key $O_2$ has a left side that corresponds to the parameters for the object O in world space, and a right side that corresponds to the parameters for the object O local to the person B.

The trajectory or path that the object O takes between the persons A and B can be defined in any suitable way. In some implementations, the trajectory is a smooth curve that connects the points where the object is released and caught, respectively. For example, a Beziér curve can be defined based on the step keys $O_1$ and $O_2$.

A constraint graph 308 indicates timing of constraint activation(s). Here, the constraint of the object O to the person A is initially "on" (e.g., having a higher value) and is set to "off" (i.e., having a lower value) when the object O is thrown. Similarly, the constraint of the object O to the person B is initially "off" and is set to "on" when the object O is caught. These constraints are referred to as the A-O and B-O constraints, respectively.

Suppose now that the user moves person B in the animation from the position 2 to a new position 3. In the state 302, a position graph 304' indicates the change in B's position. Here, the approach chosen (e.g., by the compensation module 100 in FIG. 1) to compensate for the user modification is to alter the trajectory, as indicated by the animation 301'. For example, a new curve can be calculated to make the flight path from A to B as smooth and realistic as possible. This involves some changes in the step keys $O_1$ and $O_2$. For example, the step key $O_2$ is modified to a step key $O_2'$ reflecting B's new position and the altered velocity and/or travel direction that the object O has immediately before being caught. While person A's position did not change in this example, the step key $O_1$ can be modified to a step key $O_1'$ to give the object O a different velocity and/or travel direction upon leaving A's hand.

A constraint graph 308' indicates that the B-O constraint is now switched on later than before, while the timing of the A-O constraint is unchanged.

FIGS. 4A-E show examples of an animation area 400 having a view area 402 and a timeline area 404. For example, the animation area 400 can be part of the user interface of an animation program used as part of an artistic or creative process. The view area 402 can show one or more different types of virtual environments. The virtual environments can be designed with any appearance including, but not limited to: an indoor or outdoor location or surrounding; a building, vehicle or other structure; an underwater scene; a portion of outer space; or a fictitious place. The virtual environment can be implemented as code or any other computer-readable information that a computer system uses to render the view area 402.

Figure 4A:
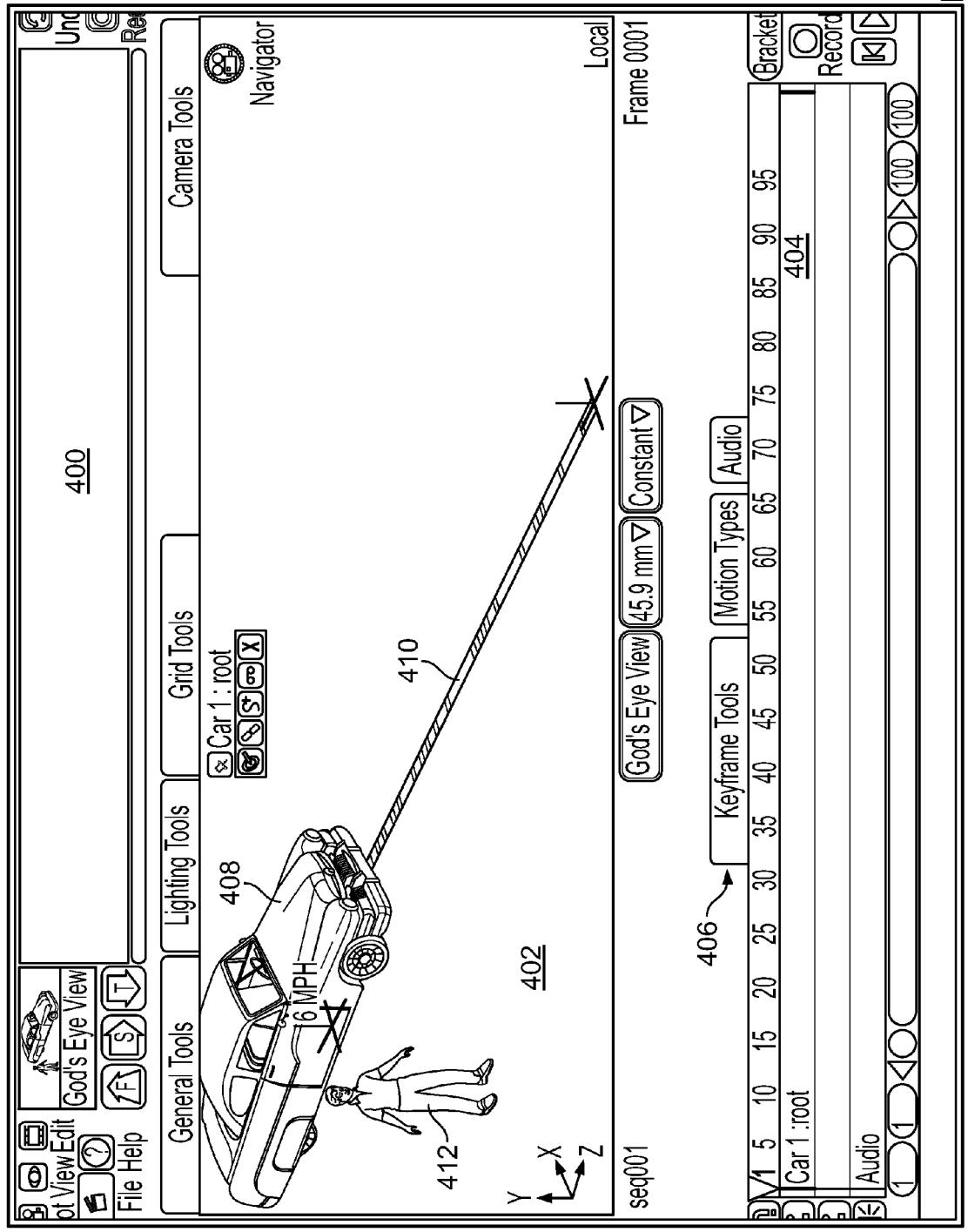
FIGS. 4A-E show examples of an animation area having a view area and a timeline area.

The view area 402 is designed for one or more scenes that are to be part of the animation. Particularly, an artist can use the animation program to create an animation sequence that shows computer-generated objects positioned and undergoing motion as defined by the animation. FIG. 4A shows "Frame 0001" of the animation.

The timeline area 404 visualizes constraints involving characters or objects in the view area 402, and can also indicate other aspects of the animation. For example, when an object is constrained to another object, the constraint can be represented as a bar in the timeline area 404. While the 3D animation is running, the timeline area 110 can be traversed from left to right by a playhead or other visual indicator that represents the flow of time, and the timeline object then indicates, with reference to the playhead, the beginning, duration and end of the corresponding movement or action. Other features that can be controlled and/or indicated in the timeline area 404 include object motion, virtual cameras, and audio content. For example, one or more virtual cameras are defined in the animation program for recording the animations, and such cameras' activities are represented by objects in the timeline area 404. A control 406 can be used to alternate between these respective modes.

Figure 4B:
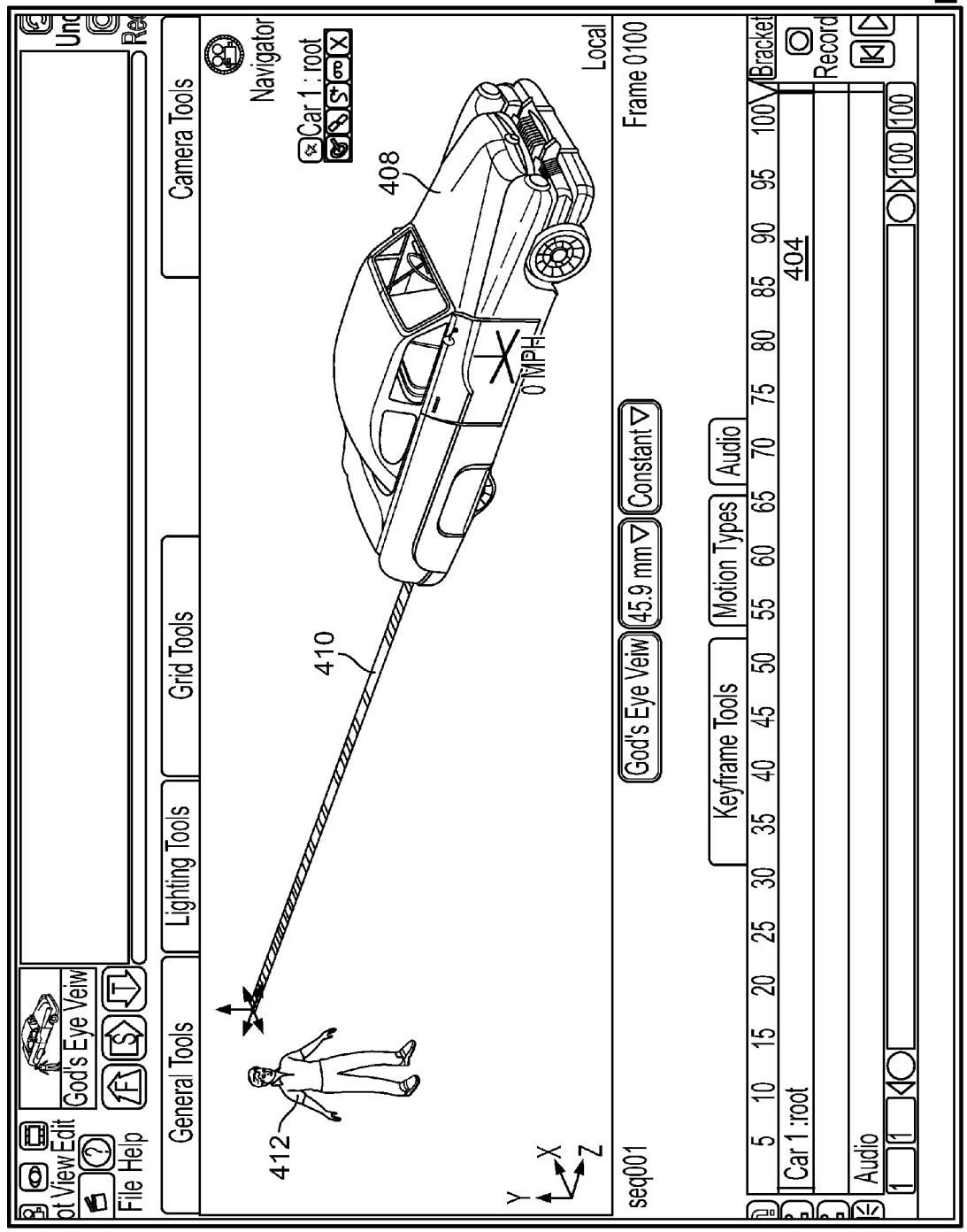

In the current state of the animation program, some or all of the animation has been created, including the movement of a car 408. That is, the car 408 is here animated to travel along a path 410. The car currently has a speed of 6 mph and FIG. 4B shows the car 408 having stopped at the end of the path 410 at "Frame 0100" of the animation.

Figure 4C:
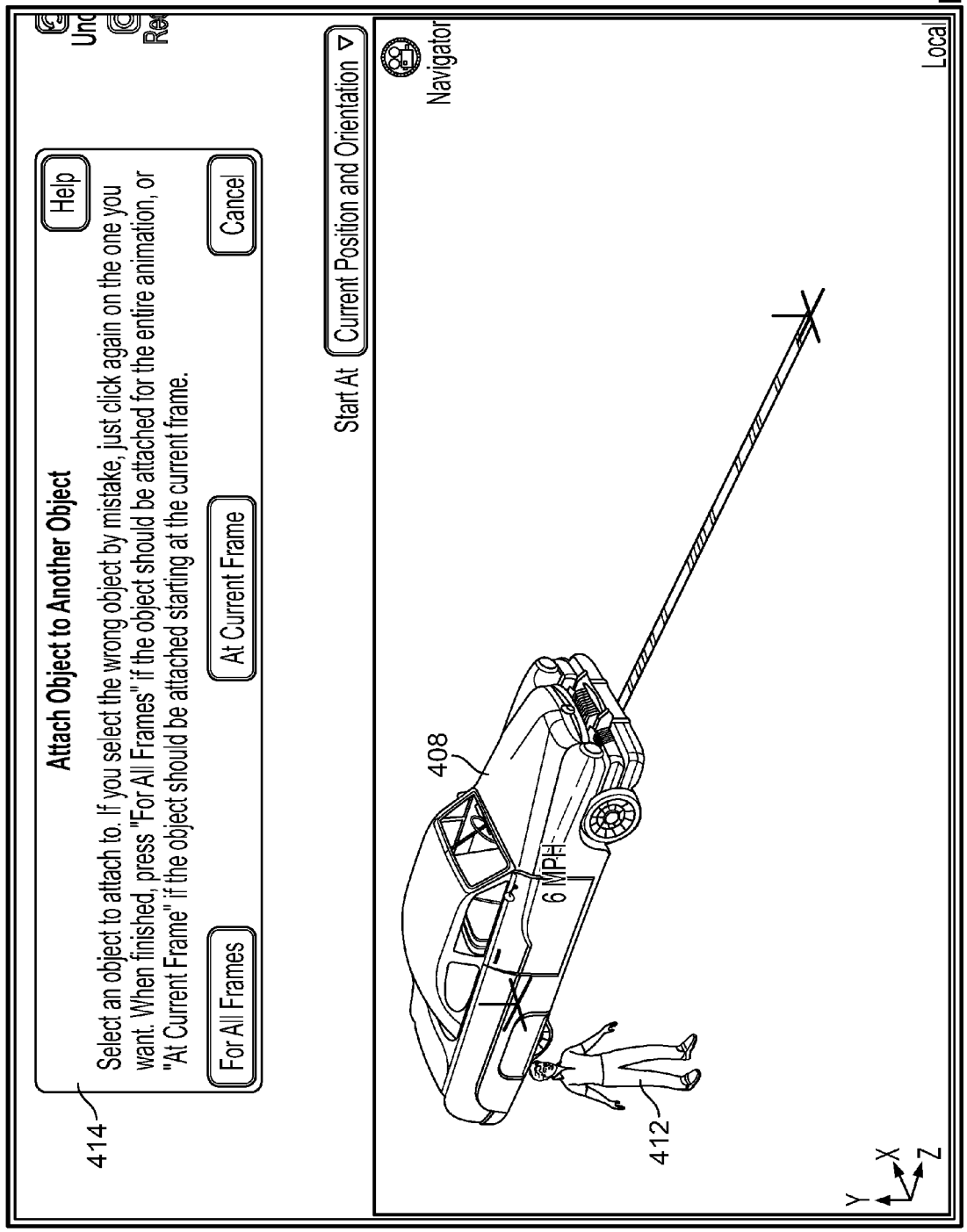

The animation also includes a person 412. No constraints are defined for the car 408 or the person 412, as indicated by the empty timeline area 404. Suppose now that the user wishes to have the person 412 be constrained to the car 408 for some period of time. Such a constraint can be used when the user is supposed to travel with the car, for example as a passenger or driver, or climb or jump onto the car from the outside. The constraint can be defined by creating an attachment between the person 412 and the car 408 for a suitable period of time. FIG. 4C shows an attachment control 414 that can be used for this and other purposes. For example, with the person 412 currently selected, the attachment control provides that the user can select another object (e.g., the car 408) to attach the person to that object. The attachment control 414 provides that the user can choose between making an attachment for all frames or for the current frame. Particularly, the user can specify when the constraint should start and end.

Accordingly, the user creates the constraint between the person 412 and the car 408. It follows that the person's location (and other parameters) will be defined relative to the car for as long as the constraint remains on. For example, the relative position may currently be defined thus: the person is located on the right hand side (i.e., passenger side) of the car, at a distance of some number of feet away, and the person is facing in the direction that the car is traveling.

Figure 4D:
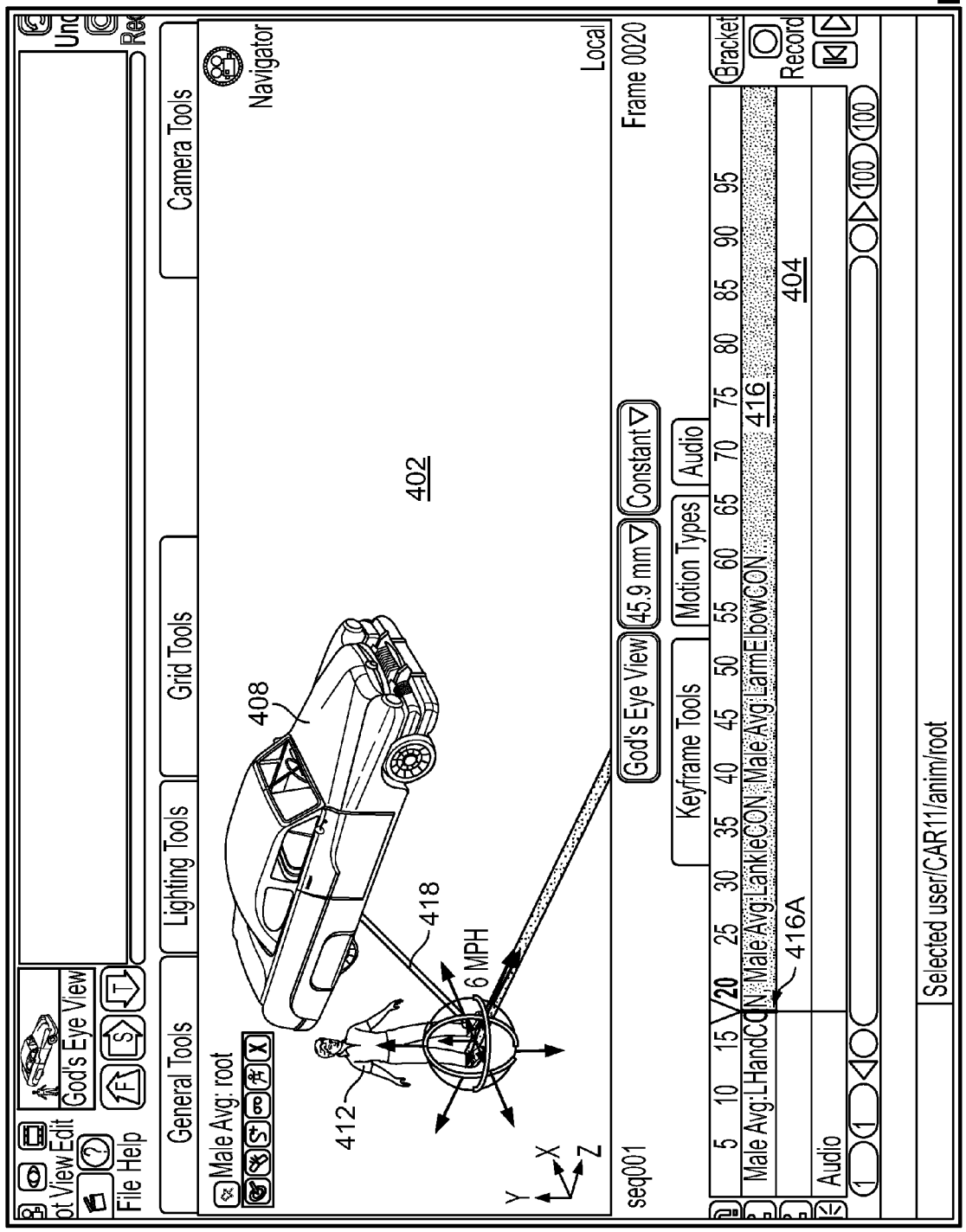

FIG. 4D shows "Frame 0020" of the animation, after a point where the constraint is switched on. The car has traveled part of the way along its path corresponding to the number of frames that have passed. Similarly, the person has been moved a corresponding distance forward, since its location is defined relative to the car's coordinates.

Moreover, the timeline area 404 includes a timeline object 416 representing the constraint. The timeline object 416 includes a start point 416A, defining when the constraint will be switched on. No explicit end point for the timeline object 416 is shown, meaning that the constraint is currently defined to remain on for the rest of the animation. Accordingly, the timeline object 416 indicates that for the corresponding duration of time, the location (or other parameters) of the person 412 is defined locally, relative to those of the car 408.

One or more other indications of the constraint can also be included. In some implementations, the view area 402 is updated to show a line 418 between the person 412 and the car 408. Each of the person and the car may have defined for it a handle or other pointer that is used when placing the object at any location. For example, the line 418 may be defined so that it runs between the handles.

Figure 4E:
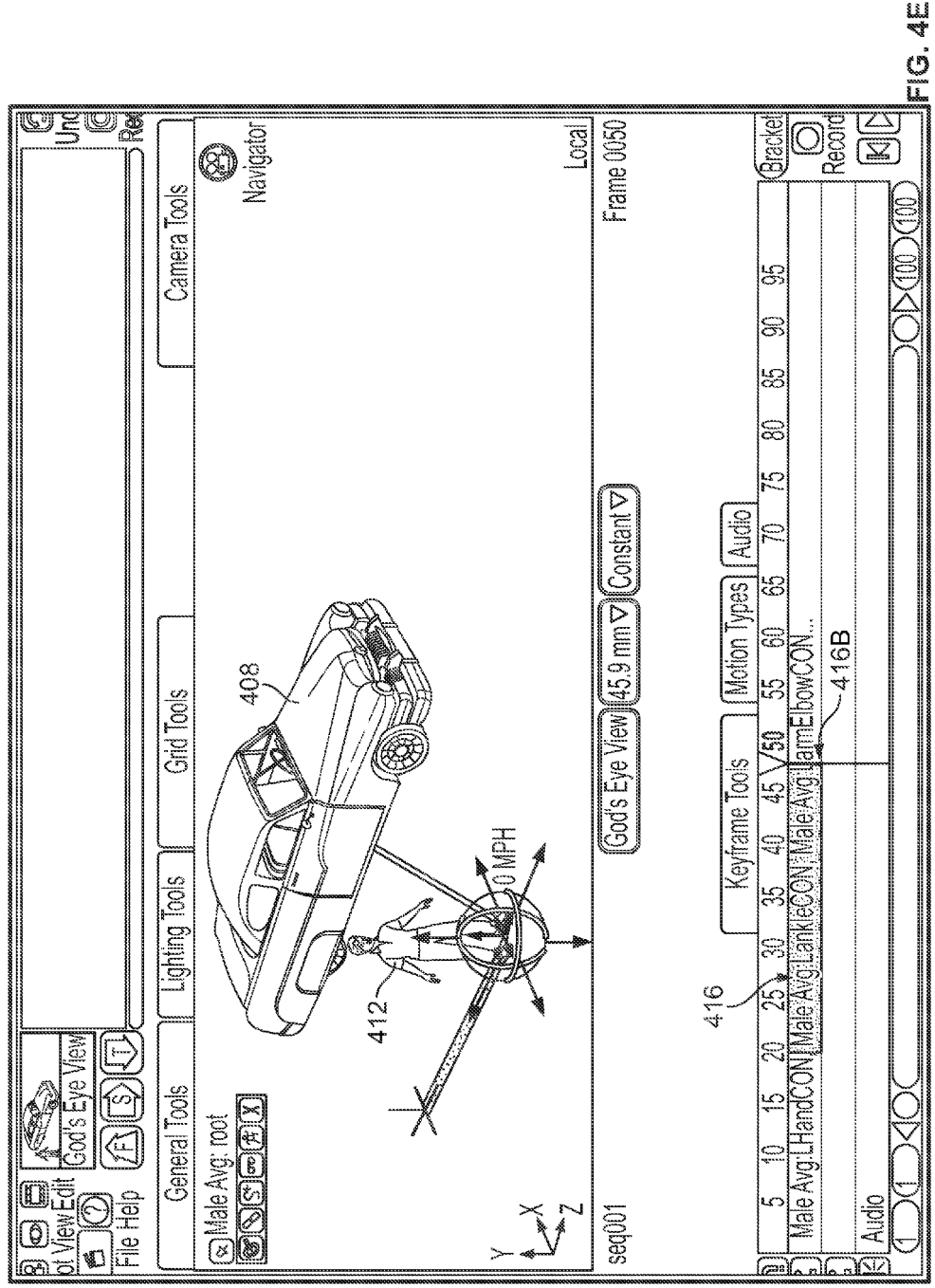

The user can specify when the constraint should be switched off. FIG. 4E shows the animation at "Frame 0050". The car has traveled further along its path, and similarly the person has been moved a corresponding difference forward. The user has defined an end point 416B that terminates the constraint object 416 before the current frame. That is, the constraint is currently off and the person 412 is no longer constrained to the car 408. In other words, constraining the person to the car caused the person to travel in the same way as the car for as long the constraint was switched on.

While in the current example the person is shown at the side of the car for clarity (e.g., so that the line 418 can be seen), a similar type of constraint can be used, to obtain a corresponding result, when the person is defined with another position relative to the car. For example, assume that the person is supposed to jump on top of the traveling car from a bridge overhead, and then remain on the car until a later time when the person jumps (or is thrown) off. In such a case, the beginning of the constraint represents the moment when the person lands on the car, and the end of the constraint similarly represents the moment when the person leaves the car.

The line 418 is still visible although the person is not currently constrained to the car. This can be helpful to the user because it indicates that the person's location (or rotation or scale) depends on another object in some other part of the animation. However, the line has been given a paler shade so that the user can distinguish constraints that are currently in effect from those that are currently switched off.

The user can manipulate the timeline object 416 in one or more ways. For example, the user can select the start point 416A with a pointing device and drag it to the left and right. Dragging the starting point to the left causes the constraint to be switched on earlier (and hence be in force longer), and vice versa. Similarly, the user can move the end point 416B to the left or to the right. The duration of the constraint is increased or decreased correspondingly.

In order for the motion of the person to be smooth and natural also after this modification, one or more compensations can be made in the animation. For example, if the start point 416A corresponds to the user landing on the car, and this landing should now take place earlier than before, then the person must begin the preceding jump earlier, or leap faster through the air, or land on a different place on the car, or some combination of these.

In some implementations, the selected compensation is to modify the person's flight through the air rather than change the landing spot. Stated somewhat differently, it may be preferred to maintain the relative position between the objects (e.g., the person and the car) in world space as of the time when the constraint is switched on (or off), and rather make any necessary adjustments outside the constraint. As a consequence, when the user changes an aspect of the constraint (e.g., switches it on earlier), this can trigger a modification of some portion of the animation where the constraint is turned off. This choice can in part be driven by what behavior the user sees as more natural and intuitive.

One or more limit values can be defined in an effort to keep the animated motions realistic. Take the situation where a person jumps from an overhead location onto a traveling car, for example. When the start point 416A is moved to an earlier point in time and it is decided to compensate by modifying (e.g., speeding up) the person's pre-constraint flight through the air. However, if the person's flight is sped up too much the animation no longer resembles a physically plausible scenario. For example, if the traveling velocity in a vertical direction exceeds the free fall limit velocity of that object in air, then the animation may be considered unrealistic. As another example, if the traveling velocity in a horizontal direction exceeds the approximate jumping ability of the person (or other type of character) being depicted in the animation, then the animation may also be considered unrealistic.

Accordingly, one or more limit values can be taken into account when compensations are made. In some implementations, the violation of a limit value can prompt some form of notification on the screen, alerting the user that the modification could possibly create an unrealistic or implausible behavior. For example, in such situations the line 418 can be colored red (or highlighted in any other way). In other implementations, the system can prohibit the change from being made upon detecting one or more limit value violations.

In some implementations, the whole constraint can be shifted forward or backward in time. For example, by selecting both of the start and end points 416A and B, the user can drag the entire constraint to an earlier or later time, without altering its duration.

Multiple start and/or end points can be selected simultaneously. In some implementations, a group selection mechanism (e.g., a rectangle—or "rect"—select) can be used to select an arbitrary number of start and/or end points. For example, assume that the selected group includes both the start and end points of a first constraint, but only the start point of a second constraint. Then, dragging the selected group will relocate the first constraint while preserving its current duration, and lengthen or shorten the second constraint as applicable.

Any suitable input device can be used in selecting and moving the start and end points 416A and B. In some implementations, a stylus or other pointing device can be used. Some implementations have a touchscreen interface that shows the output from the programs in whole or in part, and the user drags and places the object by touching the screen. The selection of the object can occur upon a particular user input, such as a click on the object, or the selection can happen intrinsically when the user begins dragging (or otherwise moving) the object.

FIGS. 5A-G show examples of situations 500A-G addressed by a compensation policy. In the situation 500A, a person initially holds the object O and thereafter releases (or throws) the object O, which may be a helium balloon, a fifty-pound weight, another character or an animal, to name just a few examples. A constraint graph 502A indicates that the constraint of the object O to the person is initially on (and may have been so at all earlier times, as indicated by the "$-\infty$" symbol). Similarly, when the constraint is switched off, it may remain so indefinitely, as indicated by the "$+\infty$" symbol. A step key graph 504A, moreover, indicates that the object O has constrained states 506 and 508, and a free state 510 in between (e.g., defined using a smooth curve).

A user may now change the situation 500 so that the release occurs earlier or later, or from a different location, than before. The compensation policy defines how to compensate for the change in the animation.

In the situation 500B, the person picks up (or otherwise catches or grabs) the object O. The constraint graph 502B defines when the constraint is off and on, respectively. Similarly, the step key graph 504C indicates an initial free state (e.g., curve-defined), followed by a constrained state relative to the person.

The situation 500C, in turn, involves the object O initially constrained to the person, thereafter being unconstrained for a period of time, and final again being constrained to the person. The constraint graph 502C indicates the constraint initially being in an "on" state, followed by an "off" state, and finally being switched on again. The step key graph 504C indicates the corresponding step keys.

The situation 500D involves the person picking up the object O, twisting and turning it, and thereafter releasing the object again. The constraint graph 502D shows the constraint's "on" state preceded and followed by respective "off" states; similarly, the step key graph 504D shows the step keys corresponding to the constraint.

In situation 500E, the person A initially holds the object O and then hands the object to person B. The constraint graph 502E indicates the respective on and off states for the A-O and B-O constraints. Similarly, the step key graph 504E indicates that the object O has one step key in this situation. The left side of the step key corresponds to A holding the object, and is therefore expressed relative to A's position. The right side of the step key corresponds to B holding the object, and is therefore expressed relative to B's position. That is, in this example, the step key represents a transition from one local space to another.

In situation 500F, the person A initially holds the object O and then throws (or releases) the object, which is caught by person B. The constraint graph 502F indicates the respective on and off states for the A-O and B-O constraints. Similarly, the step key graph 504F indicates that the object O has two step keys in this situation. The first step key has a left side corresponding to A holding the object O, and a right side corresponding to the object being unconstrained. The second step key has a left side corresponding to the object being unconstrained, and a right side corresponding to B holding the object.

The situation 500G, finally, involves the persons A and B, and also a conveyor (e.g., a car). Particularly, the person A initially holds, and then throws (or releases), the object O, which ends up on the conveyor. The conveyor travels toward person B, and at some point, the object O becomes unattached to the conveyor (e.g., the object falls, jumps, or is thrown, off the vehicle). The person B, finally, catches the object and holds it. Constraint graph 502G shows that three constraints are used: A-O and B-O constraints, similar to earlier examples, and also a constraint between the object and the conveyor. The three constraints are separated from each other by periods where the object is unattached (i.e., where the constraints are all switched off).

The step key graph 504G shows that four step keys are used for the object O in this example:

A first step key in changing the object O from A's local space to world space;

A second step key in changing the object O from world space to the conveyor's local space;

A third step key in changing the object O from the conveyor's local space to world space; and A fourth step key in changing the object O from the world space to B's local space.

Under some circumstances, a change made by the user can transform one situation into another. In the situation 500F, for example, if the user were to move (or expand) either of the A-O or B-O constraints toward the other constraint until the two meet, then two step keys would be merged into one. That is, the result would be equivalent to the situation 500E, which has only one step key. As another example, in the situation 500E the user could move (or contract) either of the A-O or B-O constraints away from the other, which would split the single local-to-local step key into respective local-to-world and world-to-local step keys. That is, making this change creates the situation 500F.

Figure 6:
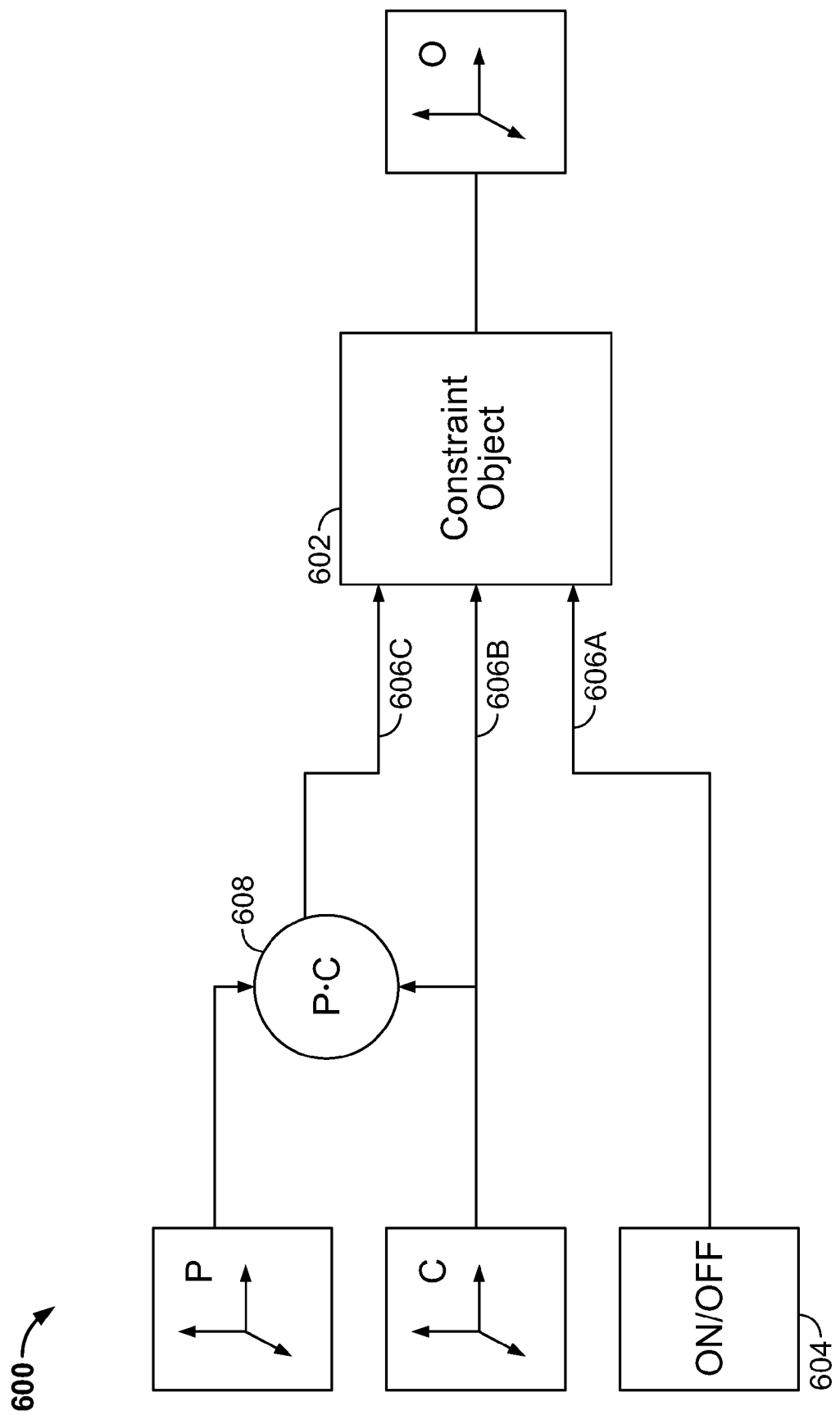
FIG. 6 schematically shows a block diagram including a constraint object.

FIG. 6 schematically shows a block diagram 600 including a constraint object 602. The constraint object 602 can be defined as computer-readable code for execution by a processor. For example, the constraint object 602 can be used in any or all examples described herein to control the constraint between two objects.

Here, the constraint object 602 receives an on or off input by a control 604. For example, the control 604 corresponds to a software switch, flag or other status variable that is assigned to a particular constraint and that can be set or reset at any time. In some implementations, a user employs the start and end points 416A and B (FIGS. 4D and E) to operate the control 604 for that particular constraint. The block diagram 600 also schematically shows entities P and C, which are the respective parent (P) and child (C) matrices for the objects in world space.

The constraint object 602 receives three inputs 606A-C. The input 606A is from the control 604 and regulates whether the constraint object should currently be in an on or off state. This status affects the output of the constraint object 602, which output is a matrix O for the object O. That is, the constraint object 602 defines object O's matrix.

When the constraint object is switched off by the input 606A, the input 606B is activated and the input 606C is deactivated. This means that the constraint object obtains the matrix C as input and passes it through as the matrix O. In other words, when the constraint object 602 is switched off, the child object (i.e., the object O), has a matrix that specifies its position (and rotation, scale, velocity, etc.) relative to world space.

In contrast, when the constraint object is switched on, the input 606C is activated and the input 606B is deactivated. The input 606C delivers the outcome of a calculation 608. In this example, the calculation 608 involves the matrix P being multiplied with the matrix C to obtain the entity P*C, which is the representation of the child object in the local space of the parent object. That is, switching the constraint object 602 on causes the matrix O to be defined relative to the object to which the child is currently constrained.

Figure 7B:
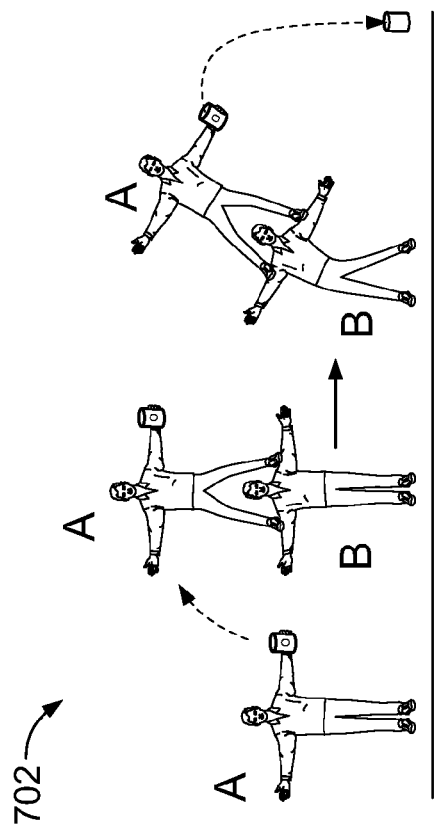
FIGS. 7A-B schematically show examples of constraint hierarchies.
Figure 7A:
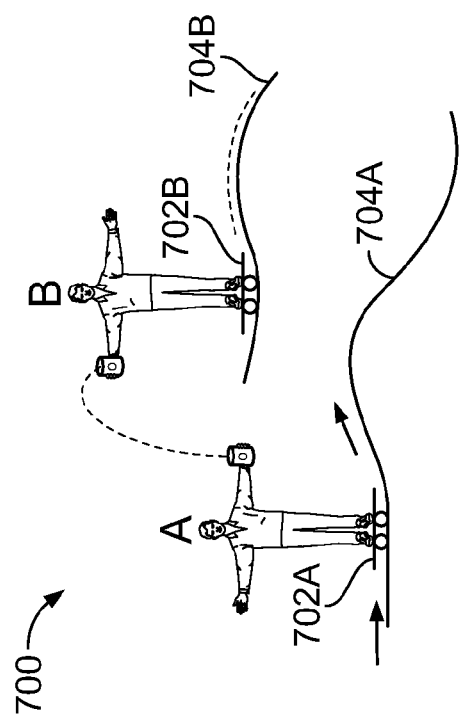

FIGS. 7A-B schematically show examples 700 and 702 of constraint hierarchies. In example 700, an object O is being thrown between persons A and B. Each of the persons is currently being carried by a respective car 702A and B. Moreover, each of the cars 702A-B is currently traveling along a respective path 704A and B.

The constraint relationships are as follows: the object O is constrained to the one of the persons (A or B) who is currently holding the object, except when the object is traveling unconstrained between the persons. Each of the persons is constrained to their respective car. Finally, each of the cars is constrained to its respective path. In other words, the example 700 illustrates a constraint hierarchy, for example such that the object O's matrix is specified relative to the person's matrix, which in turn is specified relative to the car's matrix, which is specified relative to the path.

Assume now that the user modifies the speed or direction of either of the cars 702A-B, or the shape of either of the paths 704A-B. A search is then performed to determine what compensation, if any, should be made in any other aspect of the animation. Such a search can be done up and down the constraint relationships in the hierarchy to ensure that the affected step key(s) can be adjusted. For example, if a change is made regarding the car 702A, then for purposes of compensation it is necessary to evaluate both downward in the hierarchy (i.e., the path 704A to which the car is constrained) and upward in the hierarchy (i.e., the person A who is constrained to that car, and finally also the object O that is constrained to the person).

Constraint hierarchies can change over time. In the example 702, the object O is constrained to the person A, who is initially not constrained to any other object. The person A then climbs onto the shoulders of person B while still holding the object O. Accordingly, the person A is now local to the person B, and the object O is local to the person A, as before. That is, the person A has now become part of a hierarchy from having been unconstrained, and the object O is now part of a larger hierarchy.

Next, the person A throws (or releases) the object O, which then becomes unconstrained. That is, the object O here goes from a local space that is itself local, to the world space. Accordingly, any user modification in the example 702 regarding the object O or the persons A or B, should be evaluated to determine whether any compensation should be done in any other constrained or unconstrained state.

Figure 8:
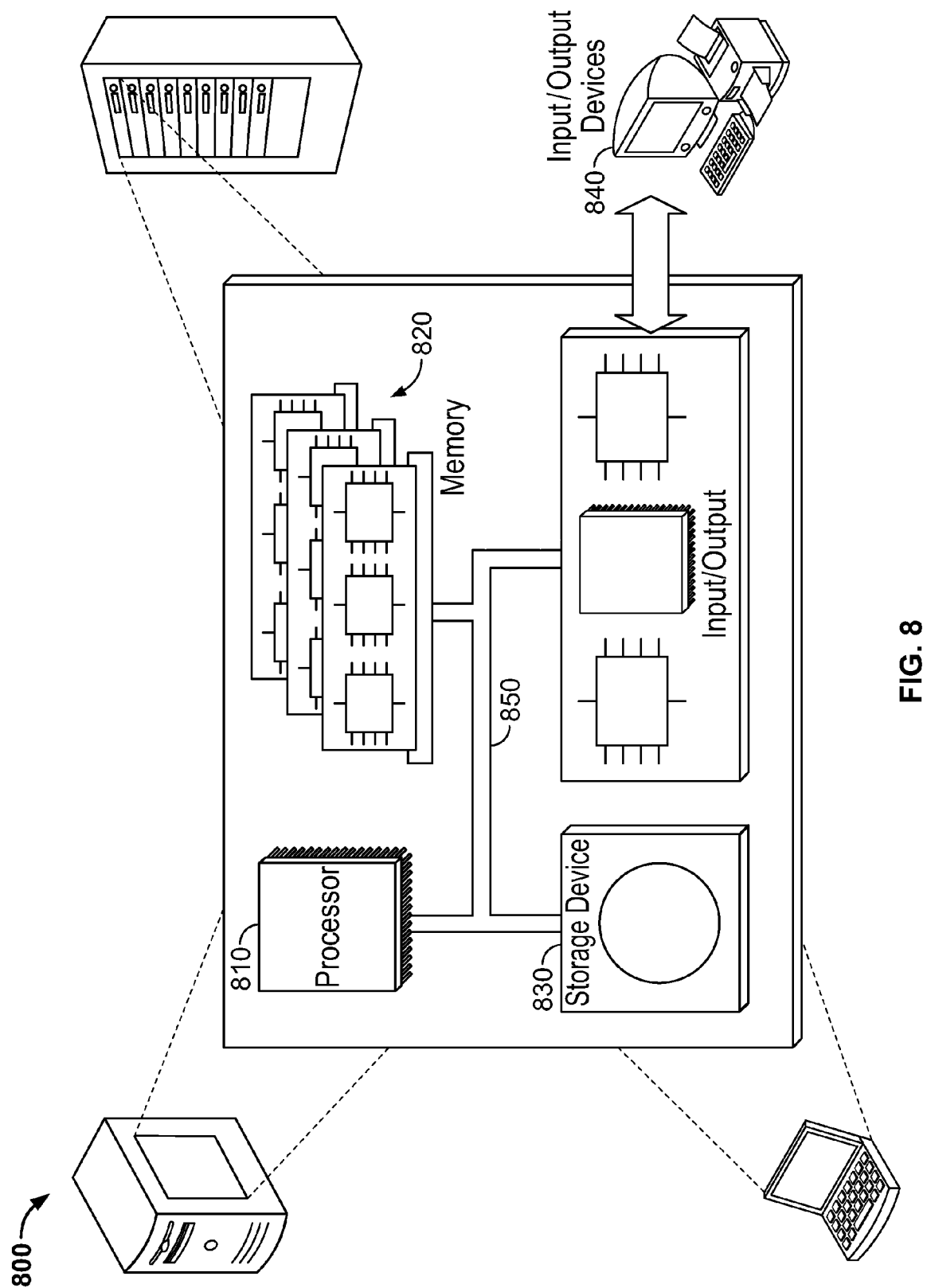
FIG. 8 is a block diagram of a computing system that can be used in connection with computer-implemented methods described in this document.

FIG. 8 is a schematic diagram of a generic computer system 800. The system 800 can be used for the operations described in association with any of the computer-implement methods described previously, according to one implementation. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable medium. The memory 820 is a volatile memory unit in some implementations and is a non-volatile memory unit in other implementations.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for handling a modification of an animation having a constraint, the method comprising:
receiving an animation involving at least first and second objects animated with respect to a global space of the animation;
detecting a user modification of the animation that involves at least the first and second objects, the first object constrained to the second object during a constrained period and non-constrained to the second object during a non-constrained period, wherein a first parameter is associated with the first object and a second parameter is associated with the second object, the second parameter being defined with respect to a coordinate system of the global space of the animation, and during the constrained period the first parameter is defined relative to the second parameter and with respect to a local coordinate system of the second object;
based on the user modification, selecting one of at least first and second compensation adjustments for the animation based on a compensation policy; and
adjusting the animation according to the selected compensation adjustment.

2. The computer-implemented method of claim 1, wherein the user modification includes changing a position of the second object.

3. The computer-implemented method of claim 2, wherein adjusting the animation comprises changing a behavior of the first object in the non-constrained period and not in the constrained period.

4. The computer-implemented method of claim 2, wherein adjusting the animation comprises changing a configuration of the second object without changing a behavior of the first object.

5. The computer-implemented method of claim 1, wherein adjusting the animation comprises traversing constraints in the animation to identify at least one step key as being affected by the user modification.

6. The computer-implemented method of claim 5, wherein the second object is constrained to a third object for at least part of the constrained period, and wherein traversing the constraints comprises searching for step keys in a constraint hierarchy.

7. The computer-implemented method of claim 1, wherein the compensation policy addresses situations involving at least:
   the constrained period being terminated by the non-constrained period;
   the non-constrained period being terminated by the constrained period;
   the constrained period being terminated by the non-constrained period, which in turn is terminated by another constrained period during which the first object is constrained to the second object;
   the non-constrained period being terminated by the constrained period, which in turn is terminated by another non-constrained period;
   the constrained period being terminated by another constrained period during which the first object is constrained to a third object;
   the constrained period being terminated by the non-constrained period, which in turn is terminated by the other constrained period during which the first object is constrained to the third object; and
   the constrained period being terminated by the other constrained period during which the first object is constrained to the third object, which in turn is terminated by another constrained period during which the first object is constrained to a fourth object.

8. The computer-implemented method of claim 1, wherein the first and second objects are displayed in a graphical user interface having an animation area, the method further comprising:
   determining, after adjusting the animation, that the user modification causes a limit violation in the animation; and
   changing, in the animation area, a representation of the constraint between the first and second objects to indicate the limit violation.

9. A computer program product tangibly embodied in a non-transitory computer-readable storage medium and comprising instructions that when executed by a processor perform a method for handling a modification of an animation having a constraint, the method comprising:
   receiving an animation involving at least first and second objects animated with respect to a global space of the animation;
   detecting a user modification of the animation that involves at least first and second objects, the first object constrained to the second object during a constrained period and non-constrained to the second object during a non-constrained period, wherein a first parameter is associated with the first object and a second parameter is associated with the second object, the second parameter being defined with respect to a coordinate system of the global space of the animation, and during the constrained period the first parameter is defined relative to the second parameter and with respect to a local coordinate system of the second object;
   based on the user modification, selecting one of at least first and second compensation adjustments for the animation based on a compensation policy; and
   adjusting the animation according to the selected compensation adjustment.

10. A computer-implemented method for handling a modification of an animation having a constraint, the method comprising:
   receiving an animation involving at least first and second objects animated with respect to a global space of the animation;
   detecting a user modification of the animation that involves at least the first and second objects, the first object constrained to the second object during a constrained period and non-constrained to the second object during a non-constrained period, wherein a first parameter is associated with the first object and a second parameter is associated with the second object, the second parameter being defined with respect to a coordinate system of the global space of the animation, and during the constrained period the first parameter is defined relative to the second parameter and with respect to a local coordinate system of the second object;
   based on the user modification, traversing constraints in the animation to identify at least one step key as being affected by the user modification; and
   adjusting the identified step key to compensate for the user modification.

11. The computer-implemented method of claim 10, wherein the first and second objects are displayed in a graphical user interface having an animation area.

12. The computer-implemented method of claim 11, further comprising:
   changing, in the animation area, a representation of the constraint between the first and second objects depending on whether the first object is currently constrained to the second object.

13. The computer-implemented method of claim 11, further comprising:
   determining, after adjusting the animation, that the user modification causes a limit violation in the animation; and
   changing, in the animation area, a representation of the constraint between the first and second objects to indicate the limit violation.

14. The computer-implemented method of claim 10, wherein the second object is constrained to a third object for at least part of the constrained period, and wherein traversing the constraints comprises searching for step keys in a constraint hierarchy.

15. The computer-implemented method of claim 10, wherein the user modification comprises at least one selected from the group consisting of: a position change, a rotation change, a scale change, a time change, and combinations thereof.

16. The computer-implemented method of claim 10, wherein the first and second objects are displayed in a graphical user interface having a view area for creating and playing the animation, and a timeline area for at least visualizing constraints for the animation, and wherein the timeline area includes a start marker and an end marker for the constrained period.

17. The computer-implemented method of claim 16, wherein the user modification moves both the start and end markers in the timeline area without changing a length of the constrained period.

18. The computer-implemented method of claim 17, wherein the user modification moves one, and not the other, of the start and end markers in the timeline area, and wherein a length of the constrained period is changed according to the move.

19. The computer-implemented method of claim 17, wherein the user modification moves one of the start and end markers to coincide with an opposite marker relating to another constraint for the first object, the method further comprising merging a step key of the moved marker with a step key for the opposite marker.

20. The computer-implemented method of claim 19, wherein the other constraint also constrains the first object to the second object, and wherein the merger creates a single continuous constraint for the first object to the second object.

21. The computer-implemented method of claim 19, wherein the other constraint constrains the first object to a third object, and wherein the merged step key represents a transition by the first object from the second object to the third object without any intervening unconstrained period.

22. A computer program product tangibly embodied in a non-transitory computer-readable storage medium and comprising instructions that when executed by a processor perform a method for handling a modification of an animation having a constraint, the method comprising:
receiving an animation involving at least first and second objects animated with respect to a global space of the animation;
detecting a user modification of the animation that involves at least the first and second objects, the first object constrained to the second object during a constrained period and non-constrained to the second object during a non-constrained period, wherein a first parameter is associated with the first object and a second parameter is associated with the second object, the second parameter being defined with respect to a coordinate system of the global space of the animation, and during the constrained period the first parameter is defined relative to the second parameter and with respect to a local coordinate system of the second object;
based on the user modification, traversing constraints in the animation to identify at least one step key as being affected by the user modification; and
adjusting the identified step key to compensate for the user modification.

23. A system comprising:
at least one processor; and
a non-transitory computer readable storage device having stored therein instructions that when executed cause the processor to generate:
a graphical user interface comprising at least an animation area for displaying an animation that involves at least first and second objects, the first and second objects being animated with respect to a global space of the animation, the first object constrained to the second object during a constrained period and non-constrained to the second object during a non-constrained period, wherein a first parameter is associated with the first object and a second parameter is associated with the second object, the second parameter being defined with respect to a coordinate system of the global space of the animation, and during the constrained period the first parameter is defined relative to the second parameter and with respect to a local coordinate system of the second object; and
a constraint object controlling when the first object is constrained to the second object and when the first object is non-constrained to the second object.

24. The system of claim 23, wherein the first and second objects are displayed in a graphical user interface having a view area for creating and playing the animation, and a timeline area for at least visualizing constraints for the animation, and wherein the timeline area includes a start marker and an end marker for the constrained period.

25. The system of claim 24, wherein the graphical user interface changes, in the animation area, a representation of the constraint between the first and second objects depending on whether the first object is currently constrained to the second object.

26. The system of claim 24, wherein upon the user modification causing a limit violation in the animation, the graphical user interface changes, in the animation area, a representation of the constraint between the first and second objects to indicate the limit violation.

27. A computer program product tangibly embodied in a non-transitory computer-readable storage medium, the computer program product including instructions that, when executed by a display device, cause the display device to:
receive an animation having a constraint and involving at least first and second objects animated with respect to a global space of the animation;
generate a graphical user interface for handling a modification of the animation, the graphical user interface comprising:
a view area for displaying the animation that involves at least the first and second objects, the first object constrained to the second object during a constrained period and non-constrained to the second object during a non-constrained period, wherein a first parameter is associated with the first object and a second parameter is associated with the second object, the second parameter being defined with respect to a coordinate system of the global space of the animation, and during the constrained period the first parameter is defined relative to the second parameter and with respect to a local coordinate system of the second object; and
a timeline area for at least visualizing constraints for the animation; and
upon receiving a user modification of the animation, traversing at least one of the constraints in the animation to identify at least one step key as being affected by the user modification and adjusting the identified step key to compensate for the user modification.

28. The computer program product of claim 27, wherein the user modification moves the constrained period in the timeline area without changing a length of the constrained period.

29. The computer program product of claim 27, wherein the user modification moves a start or end of the constraint in the timeline area, and wherein a length of the constrained period is changed according to the move.

30. The computer program product of claim 27, wherein the graphical user interface changes, in the animation area, a representation of the constraint between the first and second objects depending on whether the first object is currently constrained to the second object.

31. The computer program product of claim 27, wherein upon the user modification causing a limit violation in the animation, the graphical user interface changes, in the animation area, a representation of the constraint between the first and second objects to indicate the limit violation.

\* \* \* \* \*